United States Patent [19]

Valfrido

[11] Patent Number: 5,223,130
[45] Date of Patent: Jun. 29, 1993

[54] DEVICE FOR ORGANIC NEUTRALIZATION AND REMOVAL OF PHOSPHORUS COMPOUNDS PRESENT IN WATER BASINS

[75] Inventor: Angiolin Valfrido, Campagna Lupia, Italy

[73] Assignee: Farm Fish, S.r.l., Bologna, Italy

[21] Appl. No.: 776,331

[22] PCT Filed: Jun. 11, 1990

[86] PCT No.: PCT/IT90/00058

§ 371 Date: Dec. 11, 1991

§ 102(e) Date: Dec. 11, 1991

[87] PCT Pub. No.: WO90/15530

PCT Pub. Date: Dec. 27, 1990

[30] Foreign Application Priority Data

Jun. 13, 1989 [IT] Italy .................. 3518 A/89
Mar. 6, 1990 [IT] Italy .................. 3374 A/90

[51] Int. Cl.⁵ .................... C02F 7/00; B01F 3/04
[52] U.S. Cl. .................... 210/170; 210/220; 210/221.2; 210/242.2; 210/906; 261/120; 261/122.1; 261/124; 261/123
[58] Field of Search ............ 210/221.2, 242.2, 906, 210/220, 170; 261/120, 124, 122, 123, 122.1

[56] References Cited

U.S. PATENT DOCUMENTS

| | | | |
|---|---|---|---|
| 3,759,495 | 9/1973 | Boler | 261/120 |
| 3,794,303 | 2/1974 | Hirshon | 210/120 |
| 4,191,479 | 3/1980 | Shuck | 261/120 |
| 4,268,398 | 5/1981 | Shuck | 210/242.2 |
| 4,409,107 | 10/1983 | Busch | 261/120 |
| 4,491,518 | 1/1985 | Benaroya | 210/242.2 |
| 4,680,148 | 7/1987 | Arbisi et al. | 210/242.2 |
| 4,741,825 | 5/1988 | Schiller | 210/242.2 |
| 4,806,251 | 2/1989 | Durda | 210/242.2 |

FOREIGN PATENT DOCUMENTS

| | | | |
|---|---|---|---|
| 2108594 | 5/1972 | France. | |
| 2329331 | 5/1977 | France. | |
| 2364181 | 4/1978 | France. | |
| 47922 | 12/1980 | Japan | 210/242.2 |
| 1234994 | 10/1986 | Japan | 261/120 |
| 1527174 | 12/1989 | U.S.S.R. | 210/242.2 |

Primary Examiner—Thomas M. Lithgow
Attorney, Agent, or Firm—McAulay, Fisher, Nissen, Goldberg & Kiel

[57] ABSTRACT

The device comprises a back module 2, consisting of a housing 4 provided with an opening 10 and with a window 11, and of a front element 3, consisting of a container 20 having a tub shape and turned upside-down, designed to be partially inserted into the window 11 of the housing 4, with the lower edge of the latter below the water level of a water basin and with the opening 10 totally sunk.

A blowing unit 12 feeds air into a diffusing element 33, inside the housing 4, so that the air released in water, when going up again to the surface, is collected into said container together with the resulting froth which bears, in suspension, the products of oxidizing reactions of phosphorus compounds contained in water. The froth is then collected by collecting means 35.

10 Claims, 6 Drawing Sheets

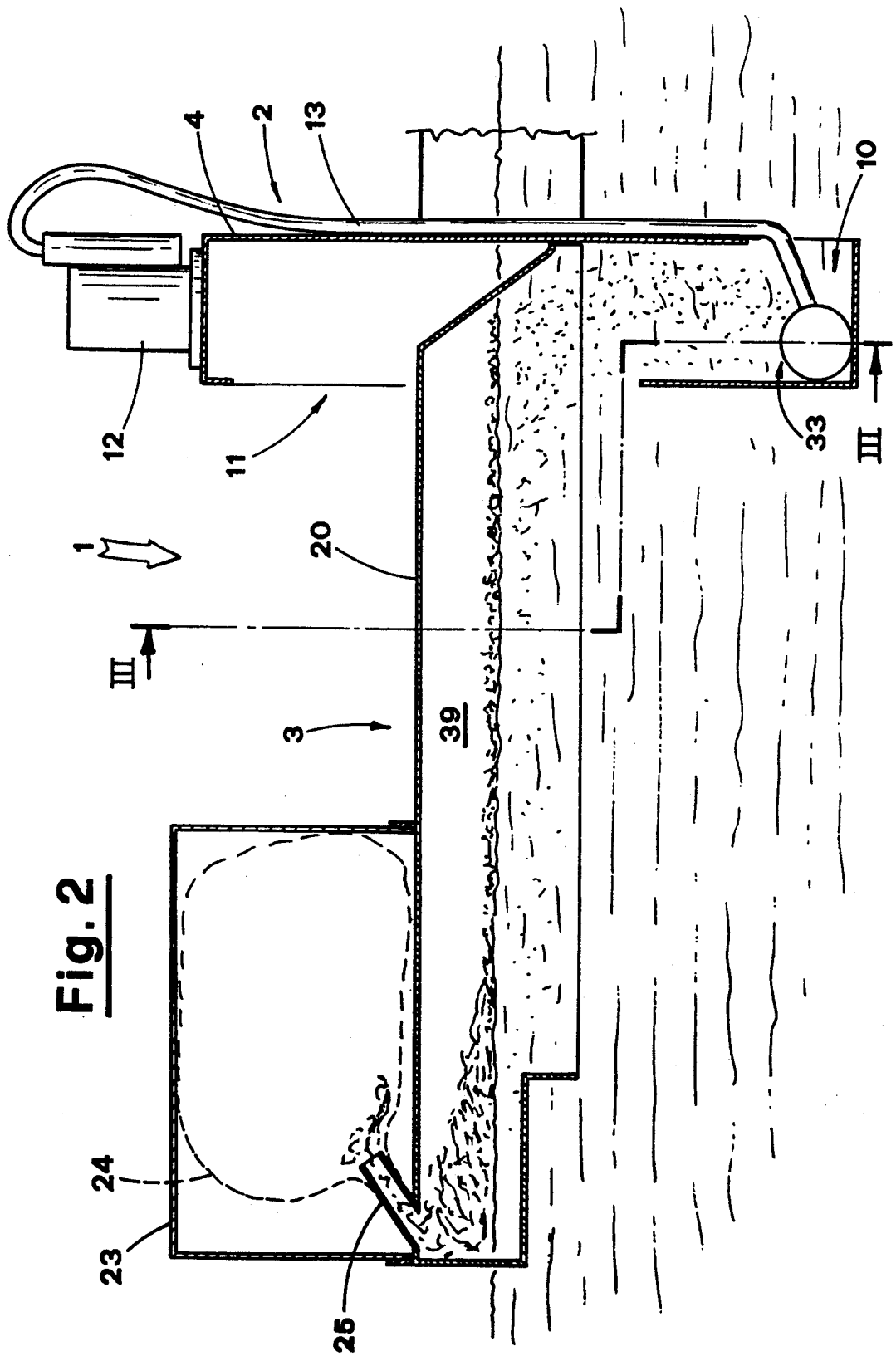

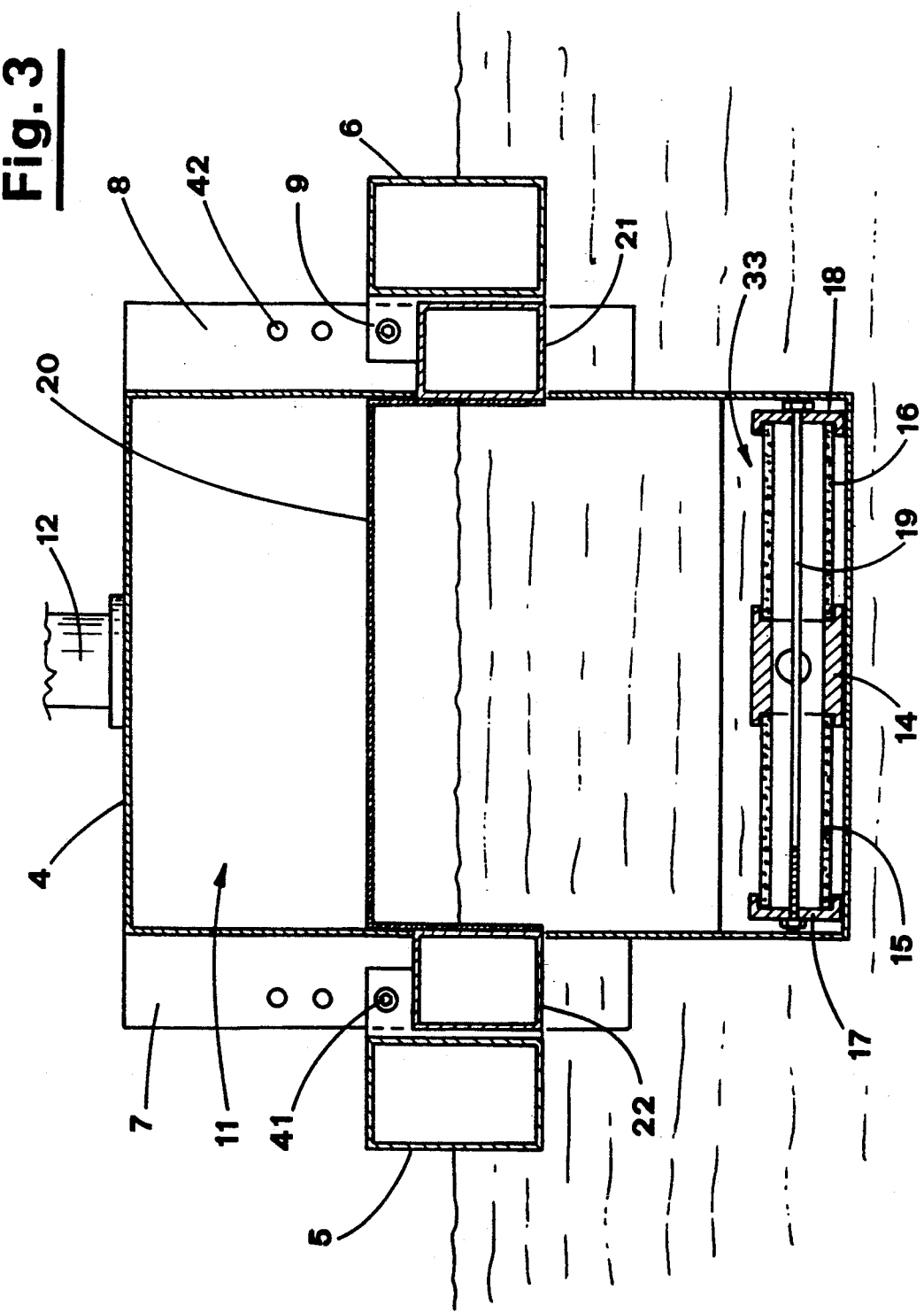

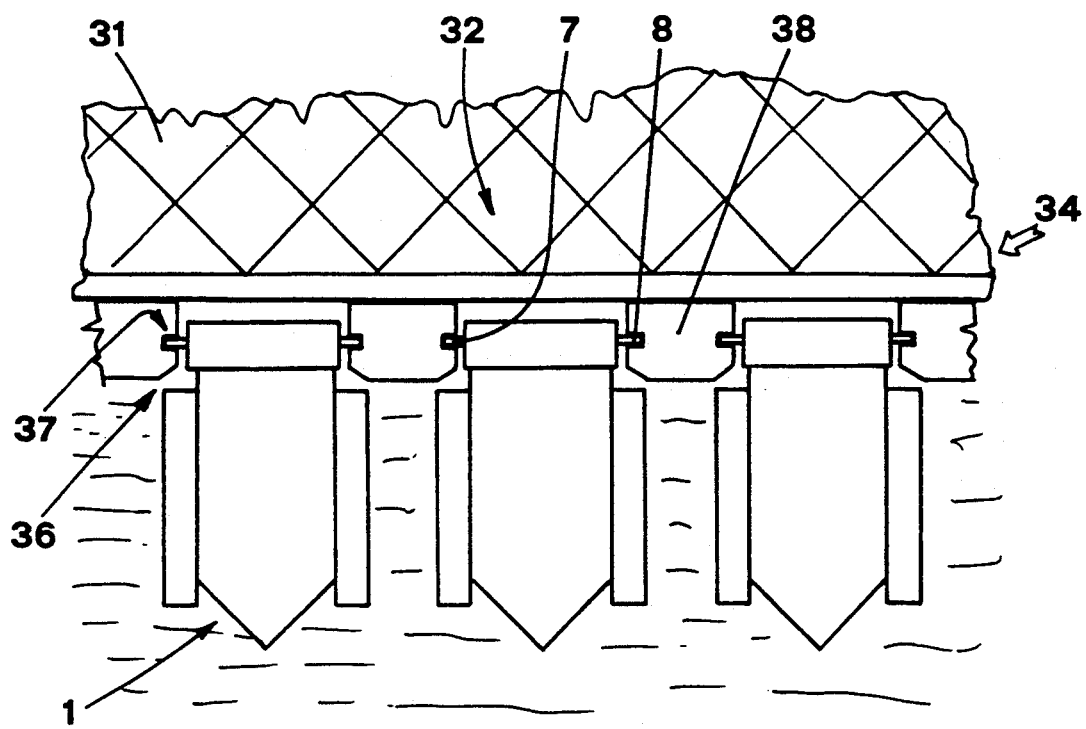
Fig. 5
Fig. 4
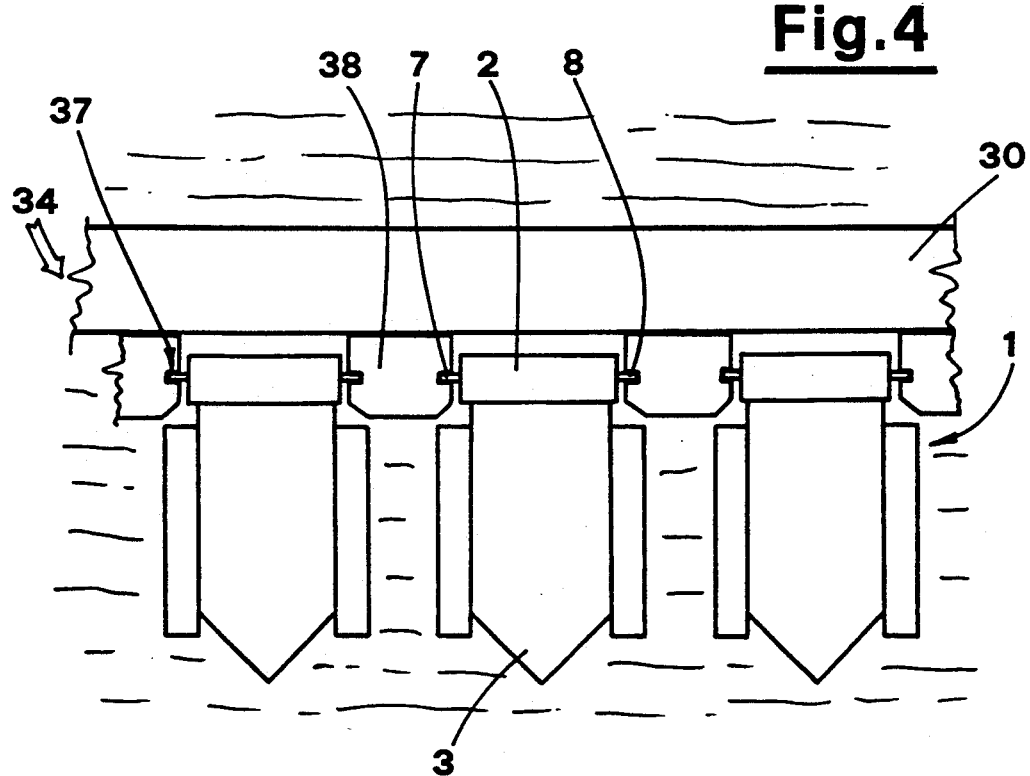

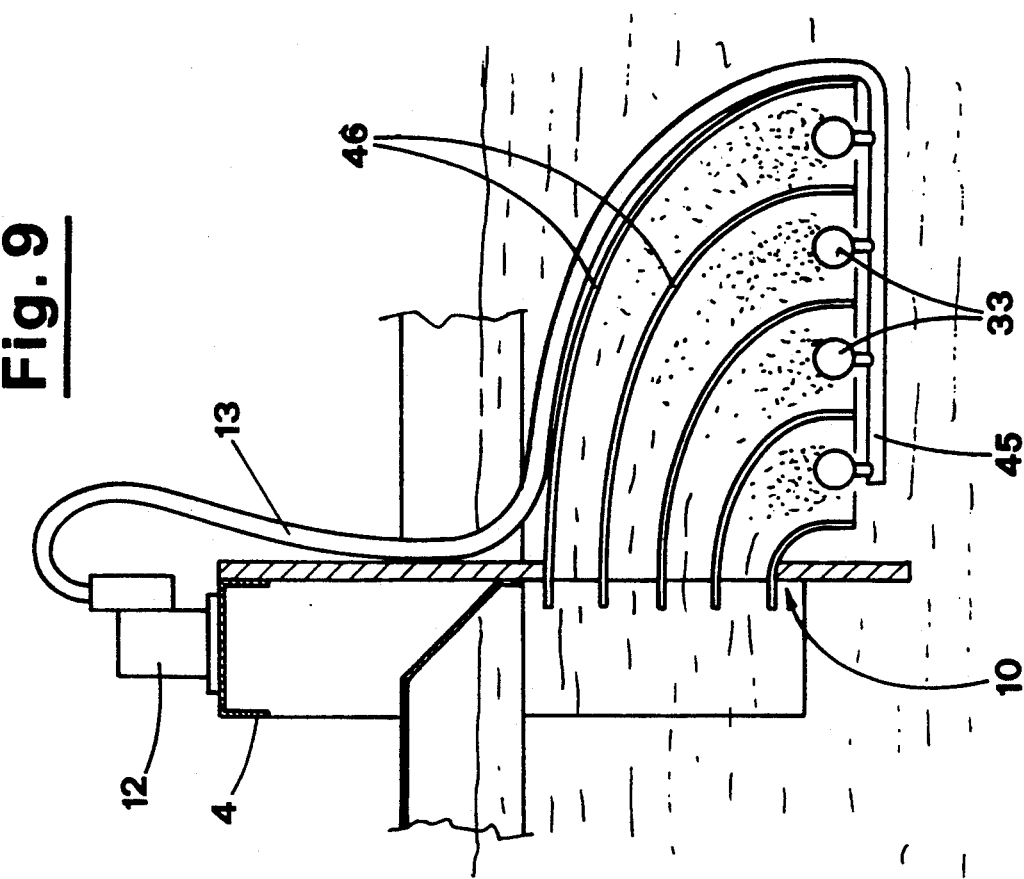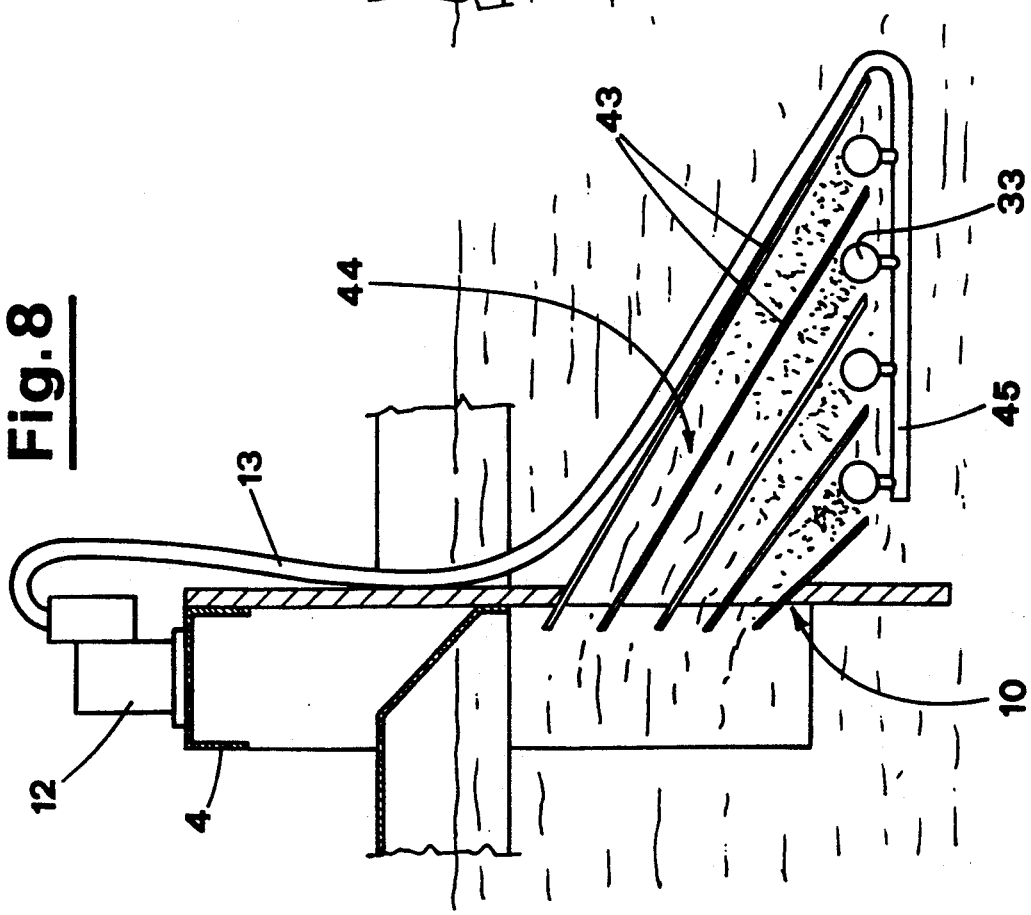

DEVICE FOR ORGANIC NEUTRALIZATION AND REMOVAL OF PHOSPHORUS COMPOUNDS PRESENT IN WATER BASINS

TECHNICAL FIELD

The invention concernes a device which is suited to achieve the neutralization and removal of phosphorus compounds present in the water of a basin, by acting biologically on the water, without adding further materials or substances, and without requiring subsequent treatments of chemical nature.

BACKGROUND ART

It is well known that the self-cleaning processes which take place in watercourses, thanks to the mobility of their waters, and when the organic loads present in them do not exceed given limits, also take place in water basins, but at insufficient levels and with poor or no results.

In particular, natural or artificial water basins, lakes or ponds, owing to the insufficent mobility of their waters, are not able to eliminate some so-called nutrient substances, i.e. substances which contribute to the development of forms of animal or vegetal life; such substances mainly consist of phosphorus and nitrogen compounds (phosphates and nitrates).

Since water retaining times in said water basins are very long, the nutrient substances accumulate, particularly in zones of the basin where the water turnover is rather slow and difficult, bringing about so-called eutrophication phenomena.

In substance, in a basin rich of nutrient substances such chain reactions are started, which cause, in warm seasons, the development of large amounts of algae and other aquatic plants, favoured by the high concentration of nutrients while in cold seasons most of the grown aquatic flora dies and falls to the bottom of the basin.

The organic matter at the bottom of the basin decomposes, absorbing large amounts of oxygen and bringing about anaerobic conditions, i.e. lack of oxygen, which originate in the bottom but progressively spread to the surrounding aquatic environment.

As a consequence, the complex biological equilibrium existing in the basin is seriously upset, and in particular toxic substances are released and consequent fish mortality occurs.

In brief, the eutrophication process, generated by an excessive supply of nutrient substances, consists in an excessive production of algae which brings about an excessive consumption of oxygen and the consequent degradation of the basin environment.

Known systems of intervention provide for the artificial aeration of basin waters. For instance, the aeration by air diffused at the bottom of the basin, carried out by means of perforated pipes, makes it possible to achieve a continuous turnover of water at the bottom, which is, therefore, sufficiently oxygenated.

However, such a system is suited to be used only as an emergency step, since it does not tackle the problem at its roots, i.e. by eliminating the nutrient substances, but simply preventing anaerobic conditions from originating at the bottom. Once aeration is stopped, the eutrophication situation is quickly re-established. In other cases, surface aerators, e.g. floating aerators, are resorted to, which bring about a stirring up of waters so increasing their oxygenation. Such mechanical means, operating at the surface, basically consist of a motor, fastened onto a floating platform, which drags a turbine into rotation. A diffuser is designed to diffuse the water column raised by the turbine in the surrounding area, so to cause an increase of the amount of oxygen dissolved in water.

The aeration carried out in this way brings about the oxidation of a part of phosphorus components and their trasnformation into products having a high degree of oxidation (orthophosphates).

However, some additional treatments, mainly of chemical nature, are later required, since the transformation of phosphorus compounds into compounds having a high oxidation degree, which are immediately assimilable by plants and organisms in general, may make the situation of eutrophication worse, instead of improving it.

Moreover, the turbine blades swallow up, together with water, also fishes which find themselves near the aerator, causing their death, and this negatively affects the yield of any fish-breeding activity carried on in the basin.

From the FR 2.364.181 a device is known for bioaeration of water.

With this device the oxidation of phosphorus is obtained by pumping the water into a cylinder dipped into the basin to be purified.

The water is taken from the basin by means of a pipe connected to a pump and then conveyed to the cylinder.

In the section of pipe from the pump to the cylinder, there is a Venturi tube, that causes air to be sucked from the outside, by means of a smaller pipe, and to be mixed with the water sent to the cylinder.

The water and air swirl in the cylinder producing a froth that floats on the water surface and is conveyed away through a large diameter pipe.

This large diameter pipe closes, with a cone-shaped end, the open upper extremity of the cylinder.

Lastly, the water is discharged in the basin through an opening 6 made in the base fo the cylinder.

DISCLOSURE OF THE INVENTION

In order to stop the abnormal development of algae effectively and definitely, it is therefore necessary to act directly on nutrient substances, controlling their amounts in the basin. In other words, it is a matter of eliminating the nutrient substances, such as potassium, iron, manganese and above all phosphorus and nitrogen, which favour their proliferation.

It has been noticed that, to achieve successful results, it is sufficient to eliminate just a single nutrient, instead of all of them, which would be an extremely expensive and hard task to carry out in practice.

In particular, an essential to the proliferation of algae is phosphorus, which is also the most convenient element to eliminate, since its amount in water is lower than that of nitrogen.

The object of the present invention is therefore to introduce a device which is suited to achieve a substantial reduction of the amounts of phosphorus compounds in the water of a basin, so to eliminate, or anyway to reduce drastically, the phenomenon of eutrophication.

The device described herein is designed to operate in a simple and effective way, by acting biologically on basin waters, without adding further materials or substances, and without requiring subsequent treatments of chemical nature, though being made through a technical solution which is easy and inexpensive to carry out.

To achieve the above object, a device for organic neutralization and for the reduction of phosphorus compounds in water basins, is proposed, that comprises a back module, formed by a parallelepipedal housing with an opening, near its bottom, and with a window near to its upper head.

The housing is provided with a blowing unit from which a tube branches off and enters the opening, in order to be connected with an air diffusing element placed at the bottom of the housing.

The back module remains partially sunk in the water of the basin and releases an air flow into water, at a predetermined depth, to achieve the oxidation of phosphorus compounds contained in the water column inside the housing and to convey the air flow upwards.

A front element comprises a container, having a tube shape and turned upside-down like a bell, partially inserted into said back module in order to receive the air flow going upwards through the water column inside the housing and to convey it towards its front part, with which a pipe union is connected, turned upwards and designed to cause the froth containing the products of the oxidation to flow into a "ventilated" soft casing placed inside a stiff casing fixed outside over the container.

BRIEF DESCRIPTION OF DRAWINGS

The features of the invention are pointed out below, with reference to the drawings attached herewith, where:

FIG. 2 shows the device of the invention, in a side view and sectioned according to a vertical symmetry plane;

FIG. 3 illustrates the device of the invention, seen according to the section line III—III of FIG. 2;

FIGS. 4 and 5 illustrate two systems for using several devices arranged in a battery;

FIGS. 8 and 9 show, in a side view and in ertical section, two further embodiments of the device in question.

MODES FOR CARRYING OUT THE INVENTION

Figure 1:
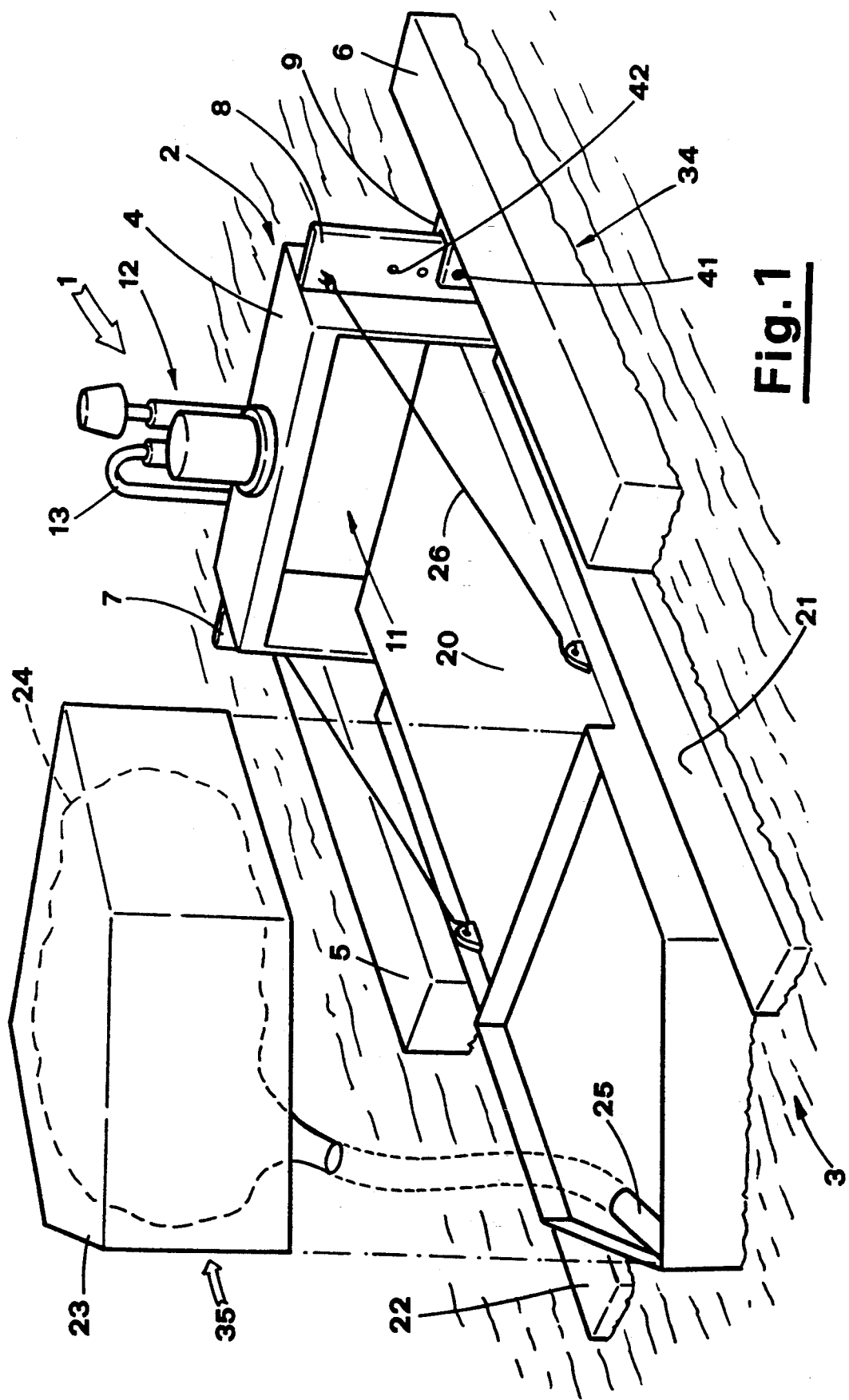
FIG. 1 is a perspective view of the device being the subject of this invention.

In the figures mentioned above, reference no. 1 indicates the device being the subject of this invention, considered as a whole. The device 1 consists of a back module 2 and of a front element 3, which may be coupled with and removed from one another, as described below. The back module 2, well visible in a side view in FIG. 2 and in a partial front section view in FIG. 3, comprises a parallelepipedal housing 4, disposed vertically and fastened, still being removable, to support means 34 which keep it partially sunk in the water of the basin where said device is due to operate.

In a first embodiment, the support means 34 consist of two floats 5 and 6 with which the housing 4 remains associated through two suitable plates 7 and 8 made integral with its side walls and inserted into corresponding guides 9 associated with the floats.

Along the guides 9, means are provided for locking the plates 7, 8, made in such a way as to allow also the adjustment of the housing depth with respect to the floats. On the plates there are holes 42, lined up vertically, which may be passed through by pins 41, associated with the guides 9. By changing the holes 42 through which the pins 41 are passing, it is thus possible to adjust the depth of immersion of the module 2 in water. The housing 4 is provided with a back opening 10, made in proximity of its bottom, and with a front window 11, made in proximity of its upper head and extending for more than half the surface of its front wall. Over the upper head of the housing 4, a blowing unit 12 is fastened, consisting of a motor and of an air pump, e.g. of the centrifugal type. From the outlet of the blowing unit, a tube 13 branches off, and extends downwards along the rear wall of the housing, enters into the latter through the opening 10, and it is connected with an intermediate point of a hollow cylinder 14, having its outlet inside that.

The two heads of the cylinder 14 are provided with two seats into which corresponding heads of as many side sleeves 15 and 16, made of porous material (e.g. pumice stone), are fitted. The remaining free heads of the sleeves 15 and 16 are closed by covers 17 and 18, applied there in a complementary way. The whole assembly made up of the central cylinder 14, side sleeves 15 and 16, and covers 17 and 18, is kept together by a tie rod 19 which passes through such components remaining locked at its ends by two threaded nuts. Said assembly makes up an air diffusing element 33, whose function is described below. The front element 3, on the other hand, comprises a container 20, having a shape with the front part ending in a point, turned upside-down like a bell and associated with two floats 21 and 22 placed on both sides and longitudinally as to itself.

Over the front part of the container 20, ending in a point, there are collecting means 35, consisting of a stiff outer casing 23, inside which a soft "ventilated" casing 24 is placed (e.g. a plastic bag). The mouth of the soft casing 24 is joined to a pipe union 25 connected with the inside of the container 20 at the apex of the front part of the latter. The outer casing 23 has the purpose of preventing wind from disconnecting the soft casing 24 from the pipe union 25.

The rear part of the container 20, which has a chute shape as illustrated in FIG. 2, is designed to be inserted into the window 11, when both the back module 2 and the front element 3 are sunk in the water of a basin where the device 1 is due to operate. The linkage between module 2 and front element 3 is made in such a way as to allow slight fluctuations with respect to each other, due to water undulation, e.g. by means of thin ropes 26, or stiff rods, or something else.

The width of the window 11 allows the adjustment of the depth of the module as to the element 3, however without interfering with the latter, which floats on water.

When the blowing unit 12 is started up, the air blown into the tube 13 is conveyed into the cylinder 14 and passes from there into the sleeves 15 and 16. Through the effect of the porosity of the material of which the sleeves 15 and 16 are made, air comes out uniformly from their surface and flows upwards inside the housing 4, bringing about the known phenomena of oxidation of phosphorus compounds, as described above in the preamble. This is achieved through the increase of the contact surface between air and water determined by the upward flow of air bubbles towards the water surface.

The products of such oxidizing reactions, generally present in the environment in the colloidal state, are dragged to the surface by the air bubbles flowing upwards through the column of water contained in the housing 4, and mostly remain suspended in the froth formed by water through the effect of air bubbling and of biological phenomena taking place (flotation).

Froth accumulates below the container 20, in the chamber 39 which is defined by water surface and by the inner surface of the container 20 (FIG. 2), and it is pushed by the air still coming out of water, towards the point of the front element. The point shape of the front part of the latter favours the conveyance of froth towards the inlet of the pipe union 25, into which said froth is thus pushed.

In conclusion, the froth, bearing the products of oxidizing reaction of phosphorus compounds in suspension, is collected inside the soft container 24, which may be replaced once it has been filled, where said froth returns to the liquid state.

Thus such products are definitely eliminated from basin waters, and the amounts of phosphates are decisively reduced. Obviously, one single device as described above may turn out to be insufficient for the job, therefore it is necessary to use several devices at the same time. Therefore, it may be required to combine several devices arranged side by side. In this case, the support means 34, to which the back modules are fastened, consist of a wharf 30, e.g. made at the inlet point of the water conduction line of the basin (FIG. 4).

Even more advantageously, the wharf 31 may be provided with a gangway 32 which makes the access to every device easier.

The devices 1 are inserted into seats 36 made in the wharf, e.g. through a series of pillars 38 alongside the wharf, and fastened through the insertion of plates 7 and 8 into suitable guides 37 made vertically along the pillars 38. Also in this case, along the guides 37, means are provided for locking the plates 7 and 8, made in such a way as to allow also the adjustment of the housing depth with respect to the floats.

Figure 6:
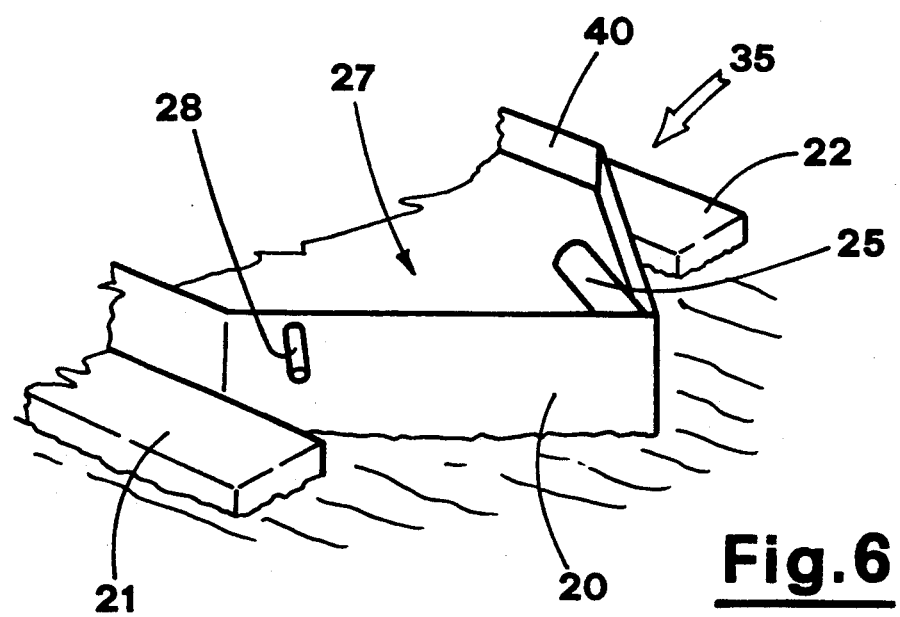
FIG. 6 illustrates a detail of the device according to this invention, with a variation.

Thus it is possible to adjust the depth of immersion in water of module 2. A variation illustrated in FIG. 6, instead of the stiff and soft casings, provides for a raising of the edge 40 of the front part of the element 3, to form a collector 27 inside which the froth accumulates. Then the froth is discharged from the container 27 through a lateral duct 28, which may be connected with a pipe 29.

Figure 7:
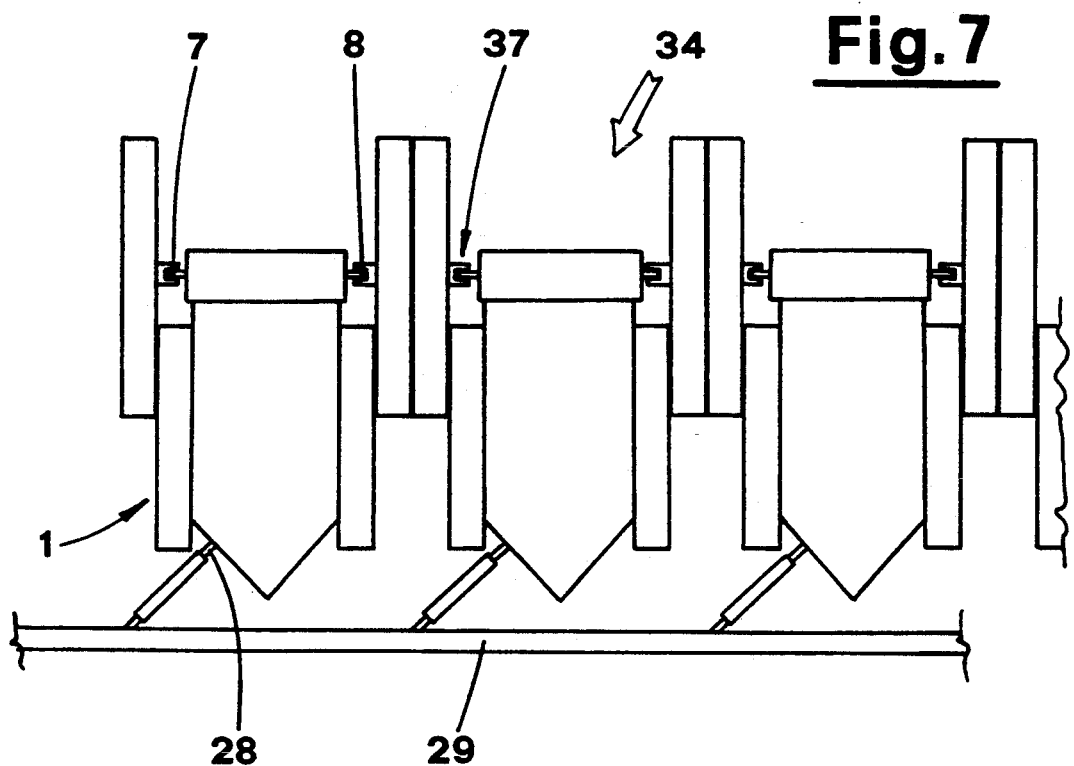
FIG. 7 illustrates a system for using several devices in a battery, made according to the latter variation.

Also in this case, several devices may be arranged in a battery and fixed to a wharf, as illustrated in FIG. 7, close to the collector pipe 29.

In order to improve the oxidizing reactions of phosphorus compounds, it may be also provided for heating the air fed into the diffusing element 33, by means of a heater of known type (not illustrated) associated with the blowing unit 12.

It is also possible to provide the device with a plurality of air diffusing elements 33, as illustrated in FIGS. 8 and 9. This makes it possible to increase the potentiality of the device, even without using several devices arranged in a battery; this latter solution is not always practicable, for instance due to the space occupied.

For this purpose, the back module 2 of the device as in FIG. 8 is provided with a plurality of means 43 for conveying the flow generated by the blowing unit 12.

Such conveying means 43 are made up of plates disposed behind the housing 4 on overlapping inclined planes, so to define, among each other, respective channels 44 which ar in communication with the inside of the housing 4 through the opening 10.

The channels 44 have a section decreasing from the bottom upwards, i.e. in the sense of flow, so to achieve a progressive increase in the speed of the same flow.

At the lower inlet of the channels 44, respective air diffusers 33 are arranged, of the type described above.

The air diffusers 33 are fed simultaneously, in parallel, by a single blowing unit 12, through a distributing means 45 connected with the tube 13. The tube 13 extends on the conveyor 43 disposed in upper position and it is connected with one end with the distributor 45, which is disposed in horizontal position below the air diffusers 33.

In the case illustrated in FIG. 9, functionally similar to the previous one, the conveying means, indicated by 46 for the sake of clarity, are made up of plates with a curved profile, in substance according to an arc describing a right angle. In that way, the channels 44 have the vertical axis at the lower mouth and have their outlet with the horizontal axis inside the housing 4. It is to be pointed out that, also in this case, the channels 44 have a section decreasing in the sense of flow.

It is understood that the above has been described by way of example and should not considered as a limitation.

Any possible variations of constructional details of the device described above are to be considered as covered by the patent hereby applied for, as described above and in accordance with the following claims.

INDUSTRIAL APPLICABILITY

Such a solution makes it possible to exploit the available water head in the best way, while remarkably increasing the delivery through the vertical section and achieving a high potentiality with a single device.

The advantages achieved by the use of the device described above are apparent, such advantages being a direct consequence of the reduction of the amounts of one of the main nutrients, i.e. phosphorus, which cause the phenomenon of eutrophication, thus tackling the problem at its root.

Moreover, the device operates in a decisive way; therefore, any further treatment, e.g. of chemical nature, is no longer required, since the products of oxidizing reactions of phosphorus compounds are definitely removed from water.

The ichthyofauna is not disturbed in any way; in particular, the device does not cause the death of fishes passing nearby. This is a particular advantage, when the basin is used for fish-breeding purposes. During the operation of the device, or of several devices arranged side by side, a real stream is generated, though not very strong, which spreads inside the basin, bringing about, as a favourable consequence, a more diffused oxygenation of water.

Finally, the advantages in terms of economy and simplicity of construction involved by the device, in accordance with an ingenious and original technical solution, suitable for effectively solving the problem described in the preamble, are self-evident.

I claim:

1. A device for organic neutralization and for the reduction of phosphorus in water basins, said device being designed to remain submerged in the water of said basin and to mix air with the water to oxidize phosphorus contained in the water and to convey a froth produced by said water and air upwards, said device comprising:

- a back module (2), support means attached to the back module for keeping the back module partially submerged in the water of said basin, said back module including a parallelepipedal housing (4) having in one of its vertical sides, an opening (10), made in proximity of a bottom of said housing, a window (11) made in proximity of an upper head of the housing, in a wall opposite to said side with the opening;
- a blowing unit (12) having a tube (13) extending therefrom to enter into said housing (14) through said opening (10), an air diffusing element placed at the bottom of the housing connected to said tube for diffusing air into said back module and creating an upward airflow therein;
- said device further comprising a front element (3) connected to the back module (2), partially fitted into said back module window (11), and having a container (20) with an upside down tube shape, said front element extends into said back module window a sufficient distance to intercept and collect the upward air flow inside the back module and the froth containing the products of said oxidation, a pipe union (25) connected tos aid front element, collecting means (35) placed over said container (20), said collecting means (35) connected to said pipe union for receiving the froth collected by said container (20), which is led through the pipe union to the collection means.

2. The device according to claim 1, wherein said support means supports the housing such that said opening (10) is completely submerged and a lower edge of said window (11) is below the water level.

3. The device according to claim 1, wherein said support means comprise floats (21, 22), and said front element (3) is connected to said pipe union (25) at a front part thereof.

4. The device according to claim 1, wherein said diffusing element (33) comprises a hollow cylinder (14) having heads with seats, said seats housing sleeves (15, 16) of porous material, said sleeves being closed by covers, (17, 18) a tie rod (19) connecting said covers, sleeves and cylinder together.

5. The device according to claim 2, wherein said support means (34) comprise two floating elements (5, 6) having guides for receiving and removably locking corresponding plates (7, 8), said plates being fixed and vertically oritend with respect to said housing and containing a plurality of vertically spaced openings for locking with said guides thereby allowing adjustment of the depth of said housing in the water.

6. The device according to claim 2, wherein said support means comprise fixed wharf bearing seats (36) for receiving said back module (2) and having guides for receiving and removably locking corresponding plates (7, 8) said plates being fixed and vertically oriented with respect to said housing and containing a plurality of vertically spaced openings for locking with said guides thereby allowing adjustment of the depth of said housing in the water.

7. The device according to claim 1, wherien said collecting means (35) comprise a ventilated soft casing (24) connected to said pipe union (25), and a stiff casing (23) fixed over the container (20) and containing the ventilated soft casing therein.

8. The device according to claim 1, wherein said collecting means (35) comprise a collector (27) formed from a raised edge (40) of a front part of the container (20), a lateral duct (28) joined to the container (20), and a collector pipe (29) connected to the duct (28) to provide communication therethrough.

9. A device for organic neutralization and for the reduction of phosphorus in water basins, said device being designed to remain submerged in the water of said basin and to mix air with the water to oxidize phsophorus contained in the water and to convey a froth produced by said water and air upwards, said device comprising:

- a back module (2), float means attached to the back module for keeping the back module partially submerged in the water of said basin, said back module including a parallelepiped housing (4) having in one of its vertical sides, an opening (10), made in proximity of a bottom of said housing, a window (11) made in proximity of an upper head of the housing, in a wall opposite to said side with the opening;
- a blowing unit (12) having a tube connected in parallel to a plurality of air diffusing elements (33), a plurality of conveying means (43, 46) comprising plural adjacent plates defining channels (44) between said adjacent plates, each channel (44) having one of said plurality of air diffusing elements located at a bottom mouth of said channel and each channel being in communication with said housing (4) through the opening (10) thereby creating an upward flow of air in said back module; and
- said device further comprising a front element (3) connected to the back module, partially fitted into said back module window (11), and having a container (20) with an upside down tub shape, said front element extending nito said back module a sufficient distance to intercept and collect the upward airflow inside the back module and the froth containing the products of said oxidation, a pipe union (25) connected to said front element, collecting means (35) placed over said container (20), said collecting means (35) connected to said pipe union for receiving the froth collected by said container (20), which is led through the pipe union to the collection means.

10. The device according to claim 9, wherein said channels (44) have a decreasing cross section from the bottom upwards, so as to provide a progressive increase of the speed of air flow through the channels.

* * * * *